United States Patent [19]

Decailloz et al.

[11] Patent Number: 4,766,285
[45] Date of Patent: Aug. 23, 1988

[54] APPARATUS FOR THE REAL TIME CHECKING OF A TOTAL PENETRATION WELD FOR A JOINT WHICH CANNOT BE DIRECTLY OBSERVED

[75] Inventors: Claude Decailloz, Palaiseau; Jean Robin, Paris; Jean-Pierre Massy, Bretigny sur Orge, all of France

[73] Assignee: Commissariat a l'Energie Atomique, Paris, France

[21] Appl. No.: 908,024

[22] Filed: Sep. 16, 1986

[30] Foreign Application Priority Data

Sep. 16, 1985 [FR] France ................................ 85 13700

[51] Int. Cl.4 .............................................. B23K 26/00
[52] U.S. Cl. .......................... 219/121.63; 219/121.62; 219/121.83
[58] Field of Search .................. 219/121 LC, 121 LZ, 219/121 LD, 121 LA, 121 LB

[56] References Cited

U.S. PATENT DOCUMENTS

| | | | |
|---|---|---|---|
| 3,278,738 | 10/1966 | Clark | 350/110 X |
| 3,867,033 | 2/1975 | Hasinger | 356/103 |
| 4,121,087 | 10/1978 | Malmuth et al. | 219/121 LB |
| 4,316,467 | 2/1982 | Muckerheide | 219/121 LB X |
| 4,663,513 | 5/1987 | Webber | 219/121 LC X |

FOREIGN PATENT DOCUMENTS 2560696  9/1985  France .

Primary Examiner—C. L. Albritton
Attorney, Agent, or Firm—Oblon, Fisher, Spivak, McClelland & Maier

[57] ABSTRACT

An optoelectronic detection system is disclosed for real time checking or inspection of a total penetration weld suitable for a joint which cannot be directly observed. The system involves an optoelectronic detector and an optical fiber with one end of the fiber being positioned so that it faces the detector and the other end collects the light intensity at the back of the welding bead. The end which collects the light intensity is cut into the shape of a cone and the optical fiber may be protected by a sheath made from a ductile material.

6 Claims, 6 Drawing Sheets

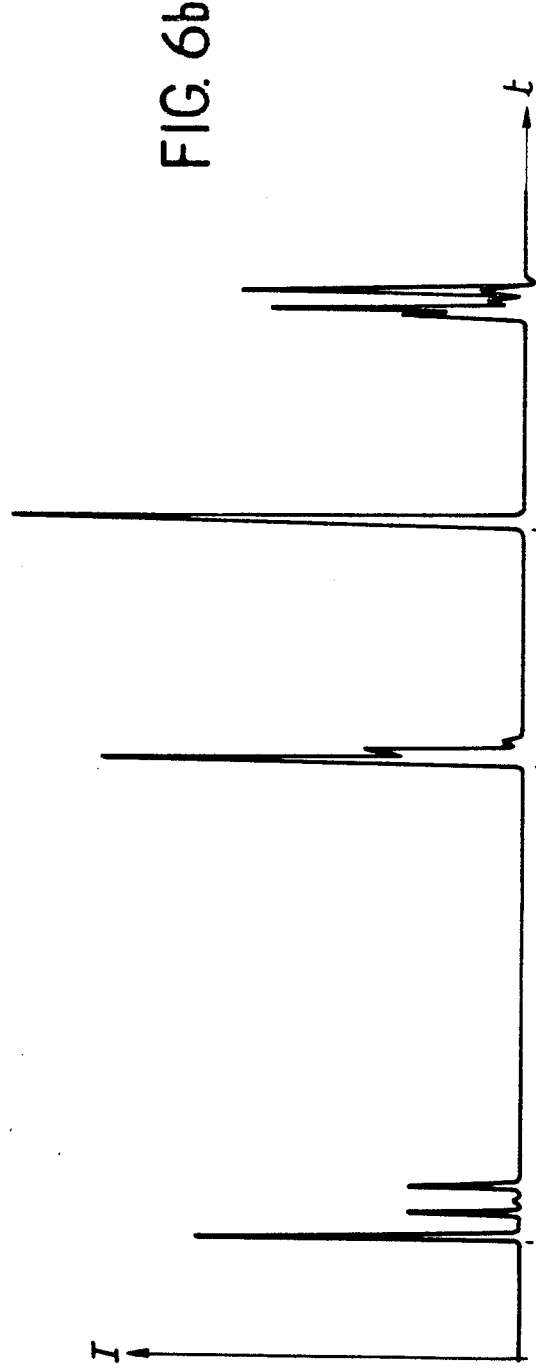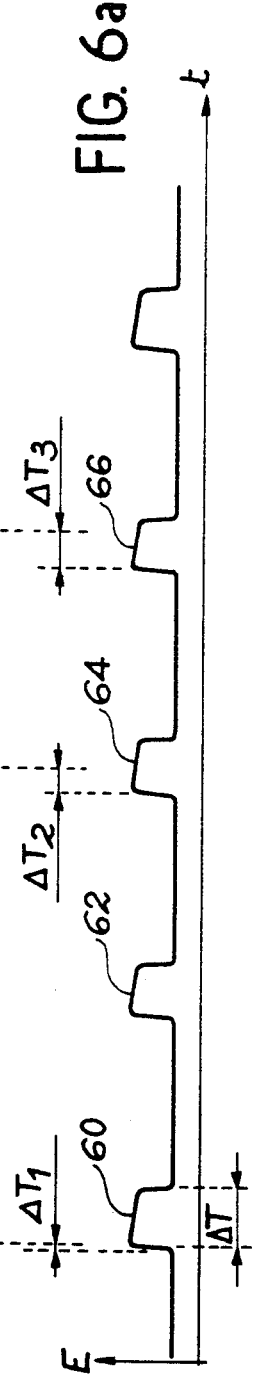

APPARATUS FOR THE REAL TIME CHECKING OF A TOTAL PENETRATION WELD FOR A JOINT WHICH CANNOT BE DIRECTLY OBSERVED

BACKGROUND OF THE INVENTION

The present invention relates to a real time apparatus for checking a total penetration weld and more specifically relates to checking the weld of a joint which cannot be observed by direct observation. The apparatus according to the invention is more particularly intended for checking welds on a substantially closed member or the welding of two long, small diameter tubes.

Assembly by total penetration welding leads, at the back of the weld, to the formation of a luminous molten bath, e.g. in the case of TIG or MIG welding, or to the formation of a luminous or light plasma constituted by metal vapours ionized to a greater or lesser extent, in the case of welding by electron or laser beam and optionally accompanied by fine molten metal droplets. Establishing these phenomena during welding makes it possible to ensure that the molten area has covered the entire thickness of the members to be assembled.

An apparatus for the real time checking of a total penetration weld comprises in per se known manner an optoelectronic means for detecting the light intensity at the back of the weld bead to the right of the welding spot, means for processing the electric signal supplied by said detection means and a signaling means.

A detection means is known, which is constituted by a box containing an optoelectronic detector and an optical processing means. This is a voluminous detection means, which can only be used when the back of the welding bead is easily observable.

A detection means is also known, which is constituted by a group of photodiodes and a detection means constituted by a group of optical fibres connected to a photodiode. In these two known detection means, the group of photodiodes and the group of optical fibres are arranged so as to detect a light signal on a circumference. In these known detection means, each photodiode or optical fibre constitutes a substantially omnidirectional detector. The number of photodiodes or optical fibres necessary for observing the complete welding bead is high. Thus, these detection means are voluminous and cannot be used for checking a total penetration weld of a joint which is difficult to directly observed.

SUMMARY OF THE INVENTION

The object of the invention is to permit a real time checking or inspection of a total penetration weld in the case of a joint which cannot or can only with difficulty be directly observed. This object is achieved by the use of a detection means comprising an optoelectronic detector and a single optical fibre, the end of the latter being cut so as to collect a light signal from a random point of the welding bead.

More specifically, the present invention relates to an apparatus for the real time checking or inspection of a total penetration weld and which is suitable for a joint which cannot be directly observed, comprising an optoelectronic detection means of an optical signal at the back of the welding bead, a processing means and a signaling means, wherein the optoelectronic detection means comprisies an optoelectronic detector and an optical fibre, whereof one end is connected to said detector and whereof the other end, located in the vicinity of the back of the welding bead, is cut in cone-shaped manner.

According to a preferred embodiment, the angle of the end cone of the optical fibre is such that the complete welding bead is in the field of vision of the optoelectronic detector, when the optical fibre is kept stationary. Preferably, the angle of said cone is between 25° and 45°.

According to a preferred embodiment, the optical fibre is at least partly combined in a sheath. The latter is advantageously made from a ductile material, which then simultaneously provides a protection and mechanical support for the optical fibre.

In a preferred manner, the processing means supplies the welding means with a welding beam intensity control signal, which is a function of the detected optical signal intensity. This makes it possible to control the power of the welding beam and ensure the total penetration of the weld.

BRIEF DESCRIPTION OF THE DRAWINGS

The invention is described in greater detail hereinafter relative to non-limitative embodiments and the attached drawings, wherein show:

FIGS. 6a and 6b, respectively the intensity of the welding beam in the case of welding by pulse beam and the intensity of the optical signal at the back of the weld as a function of said pulse beam.

DETAILED DESCRIPTION OF THE PREFERRED EMBODIMENTS

Figure 1:
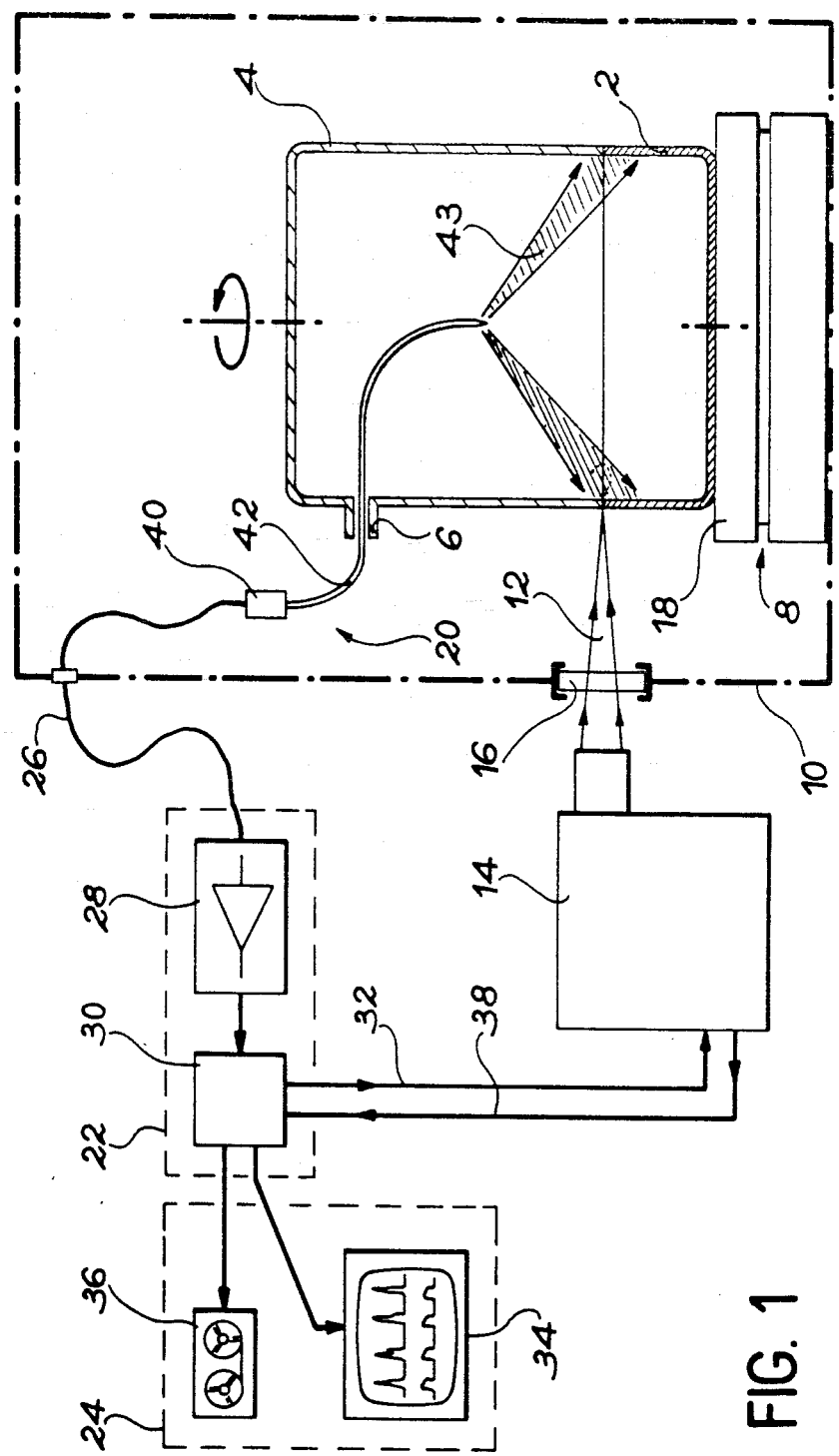
FIG. 1, diagrammatically an embodiment of the inspection apparatus according to the invention.

FIG. 1 diagrammatically shows a welding system equipped with a checking or inspection apparatus according to the invention. In an exemplified manner the case of welding by a pulse laser beam of a high performance pressure apparatus is shown. However, it is obvious that the checking apparatus according to the invention is not linked with the nature of the welding means and can in fact be associated with any known means, more particularly welding by electron beam, TIG, MIG or MAG welding.

The welding means comprises a base 2 and a ferrule 4 and said two member generally have the shape of a hollow cylinder provided with a base. Ferrule 4 has a small opening 6. The assembly of the two member to be welded forms a closed hollow cylinder.

In the case of welding by laser beams, the two members to be welded are placed on a support 8 located in an inert atmosphere in a welding enclosure 10. The laser beam 12 supplied by welding means 14, outside the welding enclosure, penetrates the latter by a porthole 16. The welding means is fixed. Welding the complete joint between the two members is brought about rotating said members about a vertical axis. This rotation can be obtained by a rotary plate 18 forming the upper part of support 8.

The weld checking or inspection apparatus comprises an optoelectronic detection means 20, a processing means 22 and a signaling means 24. Detection means 20 is located in welding enclosure 10 and is connected to the processing means 22 by an electrical connection 26 passing through the wall of welding enclosure 10. Processing means 22 can comprise an amplifier 28 followed by a servocontrol means 30 for controlling, by a channel 32, the power of the beam of welding means 14, as a function of the optical signal detected at the back of the joint. Signaling means 24 can comprise a display means 34 (plotting table, screen or the like) and a recording means 36. These means simultaneously receive a first electrical signal corresponding to the detected optical signal and a second electrical signal corresponding to the intensity of the welding beam. This second signals is supplied by the welding means to the processing means 22 on a channel 38.

According to the invention, detection means 20 comprises an optoelectronic detector 40 and a single optical fibre 42. The latter is preferably protected against mechanical actions (spattering, metal vapours, molten metal droplets, etc) by a sheath or casing. Advantageously, said sheath is made from a ductile material, e.g. stainless steel or copper. This makes it possible to shape the optical fibre in such a way that it follows a clearly defined path and remains in the optimum position without any special fixing device.

The optical detection means according to the invention consequently has the advantages of limited overall dimensions and great flexibility making it possible to reach inaccessible or difficultly accessible regions from the direct observation standpoint.

According to the invention, the end of the optical fibre collecting the light signal at the back or the joint is cut in cone-shaped manner. The angle of this cone defines the aperture of the field of vision 43 and makes it possible to place the fibre out of reach of mechanical or thermal actions due to welding and which could damage the end of the fibre or simply disturb the measurement.

The length of the fibre is adequate for moving the optoelectronic detector 40 away from the welding zone, so that it does not disturb the making of the weld and so that its operation is not disturbed by the environment (electric or magnetic field, heating, welding atmosphere, etc).

Figure 2:
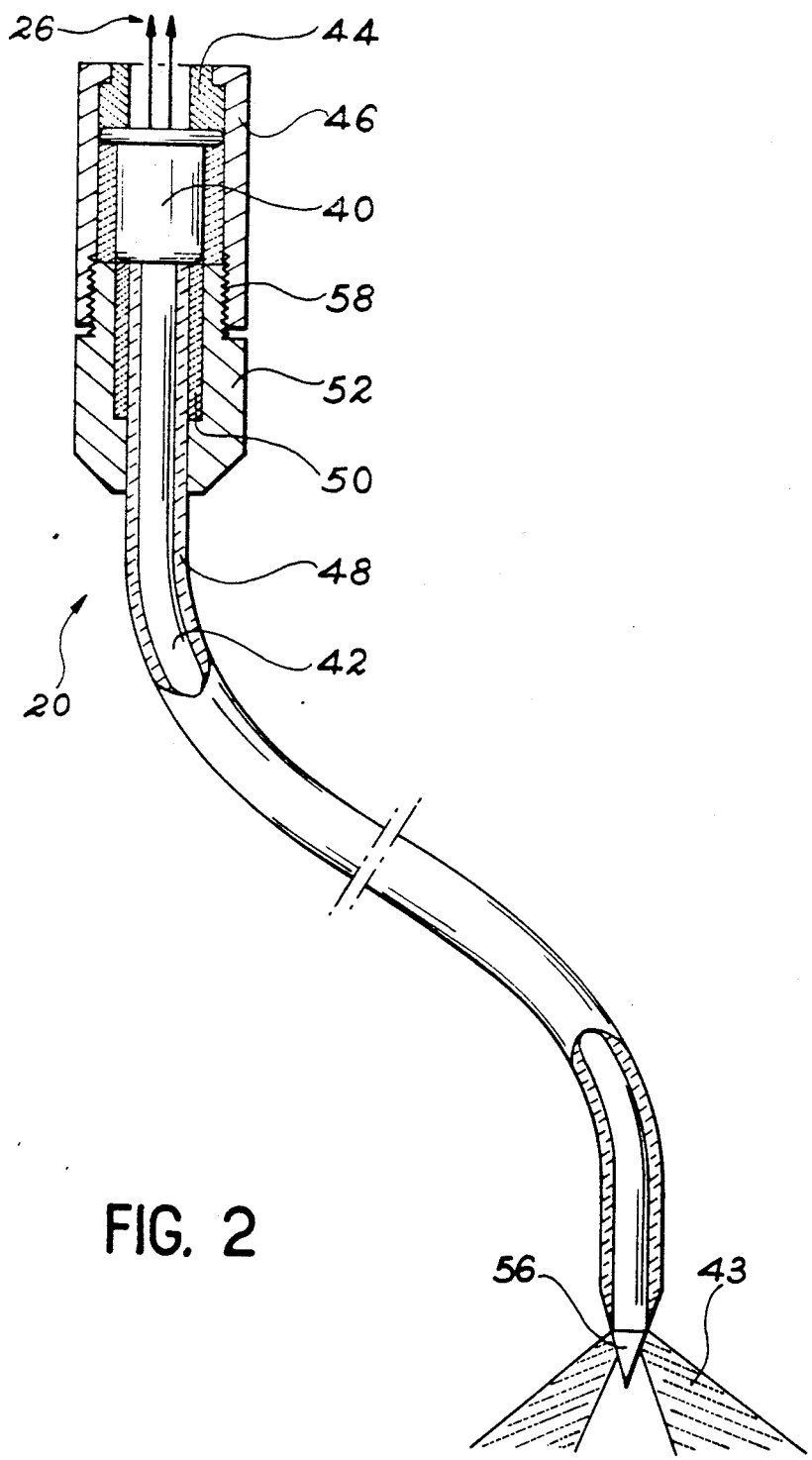
FIG. 2, an embodiment of the detection means of the apparatus according to the invention.

FIG. 2 shows a longitudinal section through the optical detection means. Optoelectronic detector 40, e.g. constituted by a photodiode, is protected by an insulating material 44 and is placed in a cylindrical support 46. Its sensitive optical part faces one end of optical fibre 42, which is protected by a sheath 48 positioned in its upper part by a collar 50. This upper part is contained in a support 52. The end 56 of the optical fibre collecting the optical signal is cut in cone-shaped manner. The field of vision 43 of the optical detection means is dependent on the aperture of said cone.

Preferably, the optoelectronic detector support 46 and the optical fibre support 52 are provided with cooperating attachment means 58. This makes it possible to make the optical fibre interchangeable and thus adapt the optical detection means to the geometry of the weld to be inspected.

FIG. 1 shows the case where the observation of the back of the welding bead is difficult, because the welded part constitutes a closed volume. The inspection apparatus according to the invention can also be used with advantage, e.g. in the case of welding two very long, small diameter tubes. The direct observation of the back of the welding bead, which is not possible with the prior art optical detection means, does not cause any difficulty when using the optical detection means according to the invention. In all cases, the end of the optical fibre is defined in such a way that its field of vision covers the complete back of the welding bead. The aperture angle of the end cone of the optical fibre makes it possible to adapt the field of vision as a function of the position and diameter of the weld.

Figure 3A:
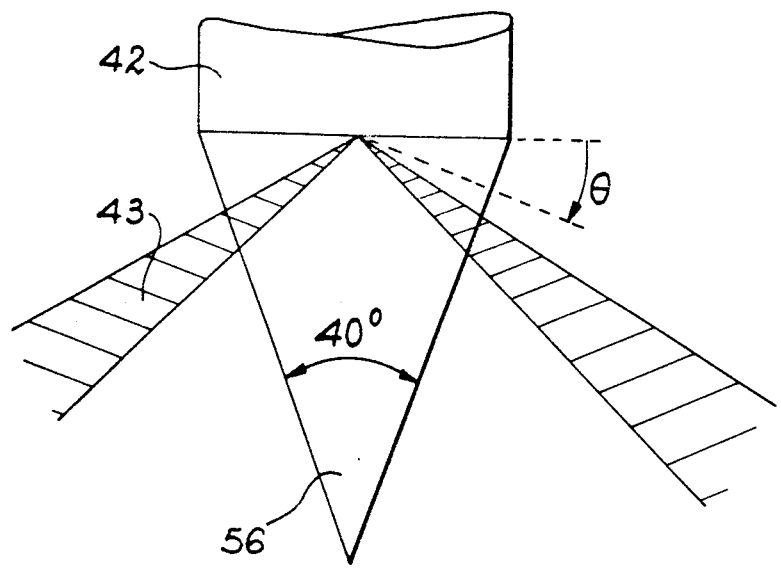
FIGS. 3a and 3b, respectively a first embodiment of the optical fibre end and the associated optical transmission characteristic.
Figure 3B:
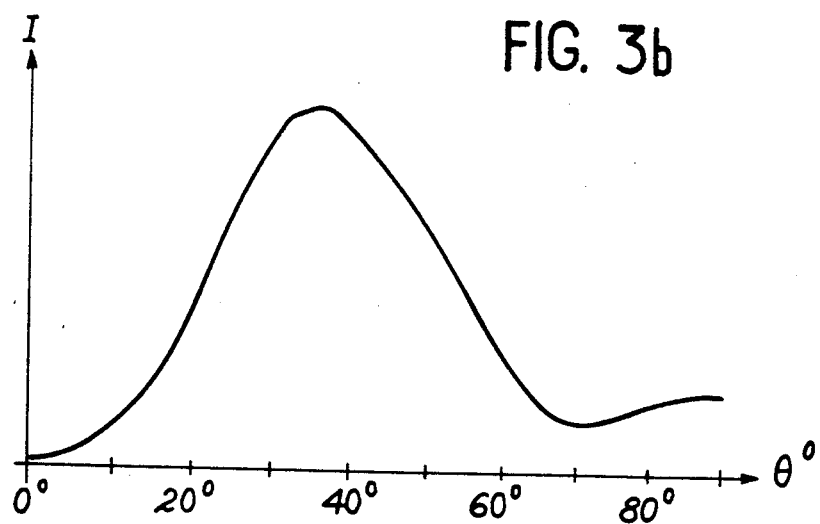
Figure 4A:
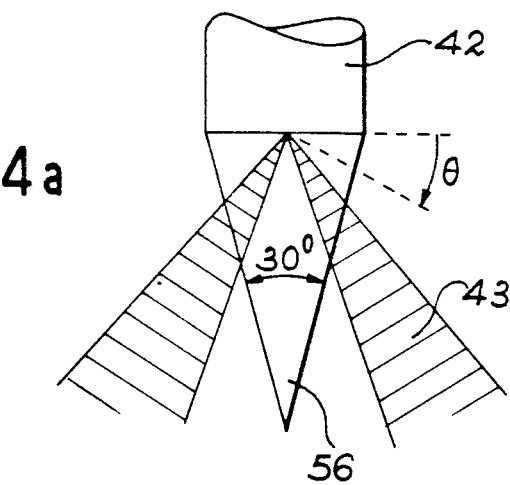
FIGS. 4a and 4b, respectively a second embodiment of the optical fibre end and its associated optical transmission characteristic.
Figure 4B:
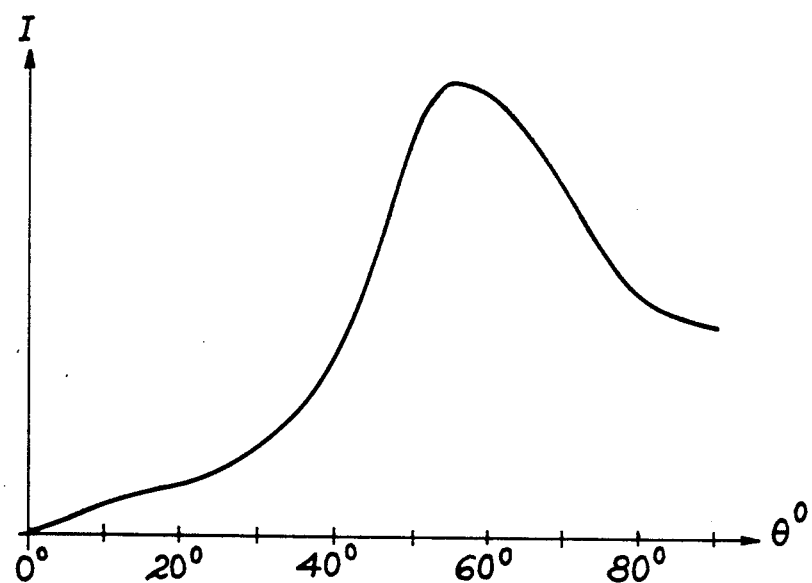
Figure 5A:
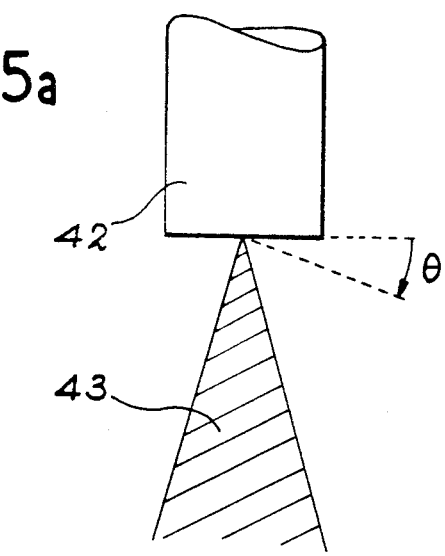
FIGS. 5a and 5b, a third embodiment of the optical fibre end and its associated optical transmission characteristic.
Figure 5B:
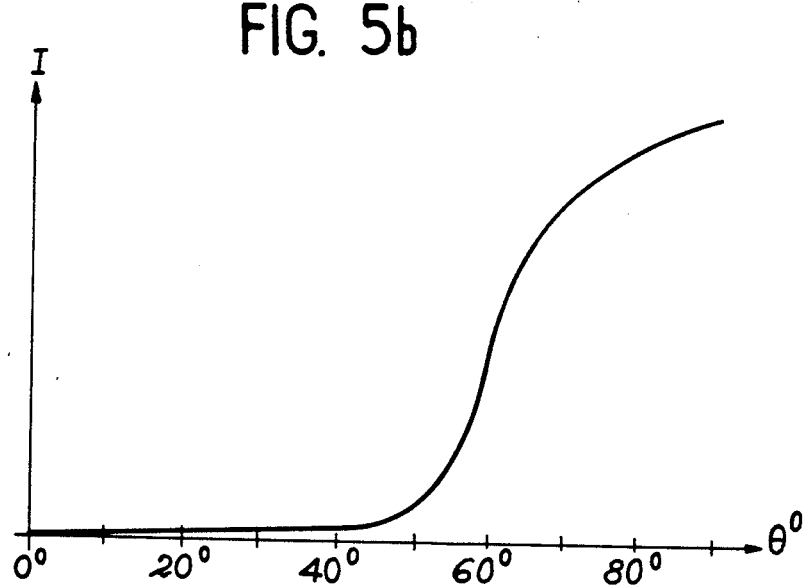

FIGS. 3a, 4a and 5a illustrate three different forms of the optical fibre end. FIGS. 3b, 4b and 5b illustrate the transmission power corresponding to each of these fibres as a function of the incidence angle of a light signal.

In FIG. 3a, the aperture of end cone 56 of optical fibre 42 is 40°. The graph of FIG. 3b shows the light intensity transmitted by the optical fibre as a function of the incidence angle $\theta$ of a light beam and shows that the field of vision 43 is between incidences 30° and 45° approximately. Bearing in mind the necessary distance of the end of the optical fibre from the welding spot or point to prevent mechanical actions, said field of vision is adapted to checking a welding operation on a circular joint with a diameter of approximately 200 mm.

In FIG. 4a, the aperture of end cone 56 is 30°. The curve of FIG 4b shows that then the field of vision 43 is approximately between incidences 50° and 60°. Such a field of vision is particularly appropriate for checking a weld on a joint with a diameter of approximately 100 mm.

FIG. 5a shows the extreme case of an optical fibre, whereof the end cone has an aperture of 180°. The field of vision is in this case a cone centered on the normal incidence and having an aperture of approximately 30°. Such an end cone geometry can e.g. be of interest when welding a base on a small diameter tube.

FIG. 6a shows the energy E as a function of the time t of the welding beam obtained by a YAG laser (yttrium-aluminium garnet semiconductor). This involves spot welding, the weld being constituted by a succession of spots with overlap, which ensures a continuous weld.

In the case of a total penetration weld, for each pulse of the laser beam, at the back of the weld there is a plasma and a corresponding light signal. The presence or absence of this light signal detected by the optoelectronic sensor makes it possible to evaluate the state of the weld at the back of the welding beam.

FIG. 6b shows the intensity of the detected light signal corresponding with the intensity of the laser beam.

The time lag or delay separating the start of the laser pulse signal from the start of the light signal at the back of the weld is an indication of the weld penetration quality. For laser beam pulse 60, the time lag $\Delta T_1$ is small and overpenetration occurs. For pulse 62, no light signal appears at the back of the welding beam, so that there is underpenetration. For pulse 64, lag $\Delta T_2$ indicates a normal penetration. Finally, for pulse 66, lag $\Delta T_3$ is substantially equal to the duration $\Delta T$ of the laser pulse, so that total penetration is just reached.

The chronograms of FIGS. 6a and 6b give details of the weld penetration quality, any possible penetration deficiencies and the coordinates thereof with respect to the initial reference position of the weld. They also make it possible to decide whether it is necessary to repair the weld in an area where penetration is considered to be inadequate through no overlap of the welding spots.

In the case where the processing means of the inspection apparatus comprises a servocontrol means for the power of the welding means, the signal shown in FIG. 6b is used for controlling the power of the welding means. This power is increased with respect to the optical signal corresponding to pulses 62 and 66 of the laser beam pulse and decreased with respect to the optical signal corresponding to pulse 60 of the laser beam.

What is claimed is:

1. An apparatus for the real time inspection or checking of a total penetration weld appropriate for a joint which cannot be directly observed, comprising:
    an optical detection means,
    a processing means; and
    a signaling means, wherein said optical detection means comprises an optoelectronic detector and an optical fibre, said fiber having one end cut in the shape of a cone and wherein said fiber end in the shape of a cone collects the light intensity present at the back of a welding bead, while the other end of said fiber is connected to said optoelectronic detector.

2. An apparatus according to claim 1, wherein the angle of the end cone of the optical fibre is such that the complete joint defined by the members to be welded is in the field of vision of said fibre, which is kept stationary.

3. An apparatus according to claims 1 or 2, wherein the end cone angle is between 25° and 45°.

4. An apparatus according to claim 1, wherein the optical fibre is at least partly contained in a sheath.

5. An apparatus according to claim 4, wherein the sheath is made from a ductile material.

6. An apparatus according to claim 1, wherein the processing means supplies a signal for controlling the intensity of the welding beam as a function of the intensity of the detected optical signal.

* * * * *